United States Patent [19]

Skeels

[11] Patent Number: 4,996,034

[45] Date of Patent: Feb. 26, 1991

[54] PROCESS FOR PREPARING SILICON SUBSTITUTED ZEOLITE COMPOSITIONS

[75] Inventor: Gary W. Skeels, Brewster, N.Y.

[73] Assignee: UOP, Des Plaines, Ill.

[21] Appl. No.: 455,490

[22] Filed: Dec. 22, 1989

[51] Int. Cl.$^5$ ............................................. C01B 33/28
[52] U.S. Cl. .................................. 423/328; 423/118; 502/85; 502/86
[58] Field of Search ............... 423/118, 326, 328, 329, 423/330; 502/85, 86

[56] References Cited

U.S. PATENT DOCUMENTS

| | | | |
|---|---|---|---|
| 4,503,023 | 3/1985 | Breck et al. | 502/85 |
| 4,597,956 | 7/1986 | Hinchey et al. | 423/328 |
| 4,610,856 | 9/1986 | Skeels et al. | 423/328 |
| 4,753,910 | 6/1988 | Han et al. | 502/85 |
| 4,840,779 | 6/1989 | Cannan | 423/328 |

*Primary Examiner*—Gary P. Straub
*Assistant Examiner*—R. Bruce Breneman
*Attorney, Agent, or Firm*—Thomas K. McBride; Richard G. Miller

[57] ABSTRACT

In the process for inserting extraneous silicon atoms into lattice sites of zeolite crystals from which aluminum atoms have been extracted, it has been found that the use of more concentrated fluorosilicate salt solutions and shorter contact times between the zeolite crystals and the salt solution than heretofore proposed, enables the production of more highly siliceous products with less defect structure. Advantageously the zeolite crystals are contacted with the concentrated fluorosilicate salt solution in a stepwise manner with the crystals being washed to remove fluoride ions between each contact with the salt solution.

7 Claims, No Drawings

PROCESS FOR PREPARING SILICON SUBSTITUTED ZEOLITE COMPOSITIONS

FIELD OF INVENTION

The present invention relates to the process for inserting extraneous silicon atoms into lattice sites of zeolite crystals from which aluminum atoms have been extracted, and more particularly to such silicon insertion by means of treating the zeolite crystals with an aqueous fluorosilicate salt solution in a manner such that the concentration of reactive silicon species in contact with the zeolite being treated is significantly increased compared with prior proposed processes to accomplish silicon insertion. In general the process utilizes more concentrated fluorosilicate salt solutions and shorter contact times thereof with the zeolite crystals thereby decreasing the conversion of reactive silicon species produced by hydrolysis of fluorosilicate salt to non-reactive species by oligomerization.

DISCUSSION OF THE PRIOR ART

In commonly assigned U.S. Pat. No. 4,503,023 there is disclosed the basic fluorosilicate treatment process for substituting extraneous silicon atoms into the crystal lattices of zeolites in the sites from which framework aluminum atoms had been extracted. The disclosed process comprises contacting a crystalline zeolite aluminosilicate having a $SiO_2/Al_2O_3$ molar ratio of at least 3 and pore diameters of at least 3 Angstroms with an aqueous solution of a fluorosilicate salt in an amount of at least 0.0075 moles per 100 grams of the zeolite (anhydrous basis), the pH of the treating solution being in the range of 3 to about 7. The fluorosilicate solution and the zeolite crystal are to be brought into contact at a rate sufficiently slow to preserve at least 60 percent of the crystallinity of the starting zeolite. The fluorosilicate solution can, in accordance with the teaching of the patent, be added to the zeolite crystals either continuously or incrementally.

Further, with respect to U.S. Pat. No. 4,503,023, it is noted that the ability to withstand aluminum extraction and maintain a high level of crystallinity is directly proportional to the initial $SiO_2/Al_2O_3$ molar ratio of the zeolite being treated with the fluorosilicate salt solution. Zeolites having an initial $SiO_2/Al_2O_3$ ratio of less than 3 were found to be general use for in the process since they could not withstand the initial loss of framework aluminum atoms. The healing effects of silicon insertion could not be brought to bear before crystal degradation occurred due to the generally slower rate of the silicon insertion mechanism compared to the dealumination mechanism, the latter believed to involve the fluoride ions in the treating solution. Unfortunately, the reaction conditions of pH and temperature which decrease the rate of aluminum extraction also decrease the rate of silicon insertion. As the pH is increased over the range of 3 to 7, the rate of aluminum extraction is decreased, but to a pH of about 7, the rate of silicon insertion is unduly slow. Increasing the temperature over the range of 20° C. to 125° C. tends to increase the rate of silicon insertion but aluminum extraction is excessively rapid for relatively low silica zeolites at temperatures much above 95° C.

THE PRESENT INVENTION

It has now been found that, contrary to prior proposed theories, a significantly improved balance between silicon insertion and zeolite crystal degradation due to extensive lattice dealumination is achieved by contacting the starting zeolite with an aqueous solution containing from 0.5 to 1.5 moles of a fluorosilicate salt in proportions such that there are present at least 0.1 moles of fluorosilicate salt per 100 grams of anhydrous zeolite, the period of contact being relatively short, i.e., from 1 to 3 hours, and thereafter removing the liquid medium containing at least 95 percent, preferably at least 98 percent, of the by-product fluoroaluminate salt from contact with the zeolite.

Accordingly the present process for substituting silicon into the crystal structure of zeolites in place of extracted lattice aluminum atoms to achieve highly siliceous zeolite compositions comprises the following procedure:

(a) providing a starting aluminosilicate zeolite having a framework $SiO_2/Al_2O_3$ molar ratio of at least about 2, preferably at least 3, and pore diameters of at least 3 Angstroms;

(b) contacting said starting zeolite at a temperature between about 25° C. and 95° C. with an aqueous solution of a fluorosilicate salt containing from 0.5 to 1.5 moles per liter of said fluorosilicate salt dissolved or slurried therein, the proportions of zeolite and fluorosilicate salt being at least 0.1 mole of salt per 100 grams of anhydrous zeolite;

(c) maintaining contact between the zeolite and the salt solution for a period not in excess of 5 hours, preferably in the range of 1 to 3 hours;

(d) removing the liquid medium containing at least 95 percent of the by-product fluoroaluminate salt resulting from the reaction of the fluorosilicate salt with the zeolite from contact with the zeolite;

(e) optionally, repeating the procedure of steps (b), (c) and (d) until a zeolite of desired $SiO_2/Al_2O_3$ ratio is obtained;

DETAILED DESCRIPTION OF THE INVENTION

In accordance with prior proposed theories, which did not take into account the competing oligomerization reaction, it was anticipated that using treating solutions of low fluorosilicate salt concentrations and using extended periods of contact between the solution and the zeolite at low temperatures, the silicon insertion reaction was favored while avoiding excessive build-up of fluoride ion and consequent aluminum extraction. In keeping with our present discoveries, however, such procedures actually were counterproductive for reasons which even at present are not entirely clear. It is apparent, however, that the reaction of a fluorosilicate salt with a zeolite is a highly complex one. C. H. Elliott has theorized, for example, that fluoride ions derived from the fluorosilicate salt also become, in some manner, attached to the constructional alkali metal oxide of the zeolite. Also, the ionization of a fluorosilicate salt is itself a complex phenomenon in which two fluoride ions become essentially immediately available in aqueous solutions, with further dissociation requiring relatively long periods to establish equilibrium. See V. N. Plakhotnik, Zhiornal Fizicheskoi Khimii, 48, 2809–2811 (1974). The further dissociations are undoubtedly affected by the reaction of the two readily produced fluoride ions of the silicate with the zeolite framework and/or cation population to form new compounds of different ionization properties.

It is also possible that the apparent disparity in the rate of zeolite dealumination and the rate of silicon insertion is due in part to the reduction of the concentration of reactive silicon species in the aqueous fluorosilicate solution contacting the zeolite being treated by an inter se reaction which produces non-reactive silica. In accordance with this theory the silicon species which reacts with the zeolite is Si(OH)$_4$. This species is produced by the hydrolysis of the fluorosilicate. When the concentration of Si(OH)$_4$ reaches the saturation point in the aqueous solution, oligomerization occurs forming SiO$_2$ as a precipitate. In effect, this oligomerization competes with the reaction of the Si(OH)$_4$ with the zeolite at the hydroxyl nest site and is a major factor in the collapse of the zeolite crystal structure during the fluorosilicate treatment. The prior proposed methods for effectively reacting a zeolite with a fluorosilicate salt are also contrary to this newer theory in that the hydrolysis of the fluorosilicate salt is enhanced in very dilute solutions and low temperatures decrease the saturation concentration of Si(OH)$_4$ with resultant precipitation of SiO$_2$. Long reaction periods favor the undesirable competing reactions at the expense of silicon insertion into the zeolite lattice.

The present process is particularly advantageous in producing zeolites having high SiO$_2$/Al$_2$O$_3$ molar ratios with minimum defect structure and is readily adaptable to a step-wise mode of operation. In the step-wise procedure, the starting zeolite is subjected to a series of treatments with the fluorosilicate salt solution, each increasing the SiO$_2$/Al$_2$O$_3$ ratio of the ultimate product zeolite. After each treatment, the zeolite is isolated from the fluorosilicate salt solution, and preferably washed with water to remove residual fluoride, and then contacted with a fresh fluorosilicate salt solution so that harmful build-up of fluoride ions and pH conditions and non-reactive silica are avoided.

The crystalline zeolite starting materials suitable for the practice of the present invention can be any of the well known naturally occurring or synthetically produced zeolite species which have pores large enough to permit the passage of water, fluorosilicate reagents and reaction products through their internal cavity system. These materials can be represented, in terms of molar ratios of oxides as:

$$M_{2/n}O:Al_2O_3:xSiO_2:yH_2O$$

wherein "M" is a cation having the valence "n", "x" is a value of at least about 2 and "y" has a value of from zero to about 9 depending upon the degree of hydration and the capacity of the particular zeolite to hold adsorbed water. Since the process is most advantageously applied to starting zeolites which are most prone to crystal degradation by too great a degree of initial aluminum extraction and by acid attack, it is preferred that the value of "x" is at least 3.0 for the starting zeolite. Also, it is preferred that at least 50%, and more preferably at least 95%, of the AlO$_2^-$ tetrahedra of the as-synthesized form of the starting zeolite are present at the beginning of the present process. Most advantageously the starting zeolite has not been subjected to any post-formation treatment which either removes aluminum atoms from their original framework sites or converts them from the normal state of being in 4-fold coordination with oxygen.

The cation population of the starting zeolite is not a critical factor insofar as substitution of silicon for framework aluminum is concerned, but since the substitution mechanism involves the in situ formation of salts of at least some of the zeolites cations, it is advantageous that these salts be water-soluble to a substantial degree to facilitate their removal from the silica-enriched zeolite product. It is found that ammonium cations form the most soluble salt in this regard and it is accordingly preferred that at least 50 percent, most preferably 85 or more percent, of the zeolite cations be ammonium cations. Sodium and potassium, two of the most common original cations in zeolites, are found to form Na$_3$AlF$_6$ and K$_3$AlF$_6$, respectively, both of which are only very sparingly soluble in either hot or cold water. When these compounds are formed as precipitates, within the structural cavities of the zeolite, they are quite difficult to remove by water washing. Their removal, moreover, is important if thermal stability of the zeolite product is desired since the substantial amount of fluoride can cause crystal collapse at temperatures as low as 500° C.

The naturally-occurring or synthetic zeolites used as starting materials in the present process are compositions well known in the art. A comprehensive review of the structure, properties and chemical compositions of crystalline zeolites is contained in Breck, D. W., "Zeolite Molecular Sieves", Wiley, N.Y., 1984, and incorporated herein by reference. In those instances in which it is desirable to replace original zeolitic cations for others more preferred in the present process, conventional ion-exchange techniques are suitably employed. Especially preferred zeolite N-A, zeolite L, and the mineral and synthetic analogs of mordenite clinoptilolite, chabazite, offretite and erionite. The fluorosilicate salt used as the aluminum extractant and also as the source of extraneous silicon which is inserted into the zeolite structure in place of the extracted aluminum can be any of the fluorosilicate salts having the general formula:

$$(A)_{2/b}SiF_6$$

wherein A is a metallic or non-metallic cation other than H$^+$ having the valence "b." Cations represented by "A" are alkylammonium, NH$_4^+$, Mg$^{++}$, Li$^+$, Na$^+$, K$^+$, Ba$^{++}$, Cd$^{++}$, Cu$^+$, H$^+$, Ca$^{++}$, Cs$^+$, Fe$^{++}$, Co$^{++}$, Pb$^{++}$, Mn$^{++}$, Ag$^+$, Sr$^{++}$, Tl$^+$ and Zn$^{++}$. The ammonium cation form of the fluorosilicate is highly preferred because of its substantial solubility in water and also because the ammonium cations form water soluble by-product salts upon reaction with the zeolite, namely (NH$_4$)$_3$AlF$_6$.

The concentration of fluorosilicate salt in the aqueous solution employed is within the range of 0.5 to 1.5 moles per liter of solution to be used. These concentration values are with respect to true solutions, and are not intended to apply to the total fluorosilicate in slurries of salt in water and used as a reagent—the undissolved solids being readily available to replace dissolved molecular species consumed in reaction with the zeolite and by hydrolysis. As stated hereinabove, the amount of dissolved fluorosilicate employed with respect to the particular zeolite being treated will depend upon the incremental increase in SiO$_2$/Al$_2$O$_3$ ratio desired and upon the ability of the zeolite to withstand the initial contact with the salt solution.

In this disclosure, including the appended claims, in specifying proportions of zeolite starting material or adsorption properties of the zeolite product, and the like, the anhydrous state of the zeolite will be intended unless otherwise stated. The anhydrous state is considered to be that obtained by heating the zeolite in dry air at 450° C. for 4 hours.

It is apparent from the foregoing that, with respect to reaction conditions, it is desirable that the integrity of the zeolite crystal structure is substantially maintained throughout the process, and that in addition to having extraneous (non-zeolitic) silicon atoms inserted into the lattice, the zeolite retains at least 65 and preferably at least 90 percent of its original crystallinity. A convenient technique for assessing the crystallinity of the products relative to the crystallinity of the starting material is the comparison of the relative intensities of the d-spacings of their respective X-ray powder diffraction patterns. The sum of the peak heights, in terms of arbitrary units above background, of the starting material is used as the standard and is compared with the corresponding peak heights of the products. When, for example, the numerical sum of the peak heights of the product is 85 percent of the value of the sum of the peak heights of the starting zeolite, then 85 percent of the crystallinity has been retained. In practice, it is common to utilize only a portion of the d-spacing peaks for this purpose, as for example, five of the six strongest d-spacings. In zeolite Y these d-spacings correspond to the Miller Indices 331, 440, 533, 642 and 555. Other indicia of the crystallinity retained by the zeolite product are the degree of retention of surface area and the degree of retention of the adsorption capacity. Surface areas can be determined by the well-known Brunauer-Emmett-Teller method (B-E-T), J. AM. Chem Soc. 60 309 (1938), using nitrogen as the adsorbate. In determining the adsorption capacity, the capacity for oxygen at $-183°$ C. at 100 Torr is preferred.

The invention is illustrated by the procedure of the following examples:

EXAMPLE 1

(a) As an example of a typical secondary synthesis procedure of the prior art, an ammonium ion-exchanged sample of zeolite Y having a $SiO_2/Al_2O_3$ ratio of 4.84 was treated with an aqueous ammoniumfluorosilicate (AFS) solution in proportions of zeolite and AFS theoretically capable of replacing all of the framework aluminum atoms with silicon atoms. Two grams of the zeolite were slurried in 100 ml. of 3.5 molar aqueous ammonium acetate solution at 75° C. A solution of AFS was prepared by dissolving 1.58 grams of AFS in 50 ml. of water, and added to the zeolite slurry in increments of 5 ml. solution every five minutes while maintaining the temperature of the reaction mixture at 75° C. When all of the AFS solution had been added, the aqueous medium in contact with the zeolite contained about 1.05 weight percent AFS. The combined slurry and AFS was permitted to digest quiescently for 20 hours. Thereafter, the zeolite product was recovered by filtration, washed with water and dried. The filtrate was analyzed for silicon and aluminum and chemical, X-ray, infrared and differential thermal analyses were performed on the zeolite Y product. The results are shown in Table 1, below.

TABLE I

|  | Starting NH$_4$—y | LZ-210 PRODUCT |
|---|---|---|
| mmoles of Si added | — | 8.90 |
| mmoles of Si consumed | — | 7.40 |
| mmoles of Al recovered | — | 5.32 |
| % dealumination | — | 60 |
| Solid analysis | 4.84 | 14.12 |

TABLE I-continued

|  | Starting NH$_4$—y | LZ-210 PRODUCT |
|---|---|---|
| $SiO_2/Al_2O_3$ |  |  |
| Cation Equivalent, M$^+$/Al | 0.99 | 1.24 |
| Wt % fluoride | 0 | 3.45 |
| Retained X-Ray Crystallinity, % | 100 | 72 |
| Unit Cell, a$_o$ (A) (est.) | 24.73 | 24.44 |
| Framework Infrared |  |  |
| asymmetric stretch, cm$^{-1}$ | 1014 | 1060 |
| symmetric stretch, cm$^{-1}$ | 786 | 814 |
| Crystal Collapse Temp, °C. (DTA) | 861 | 783 |

(b) For purposes of comparison with the procedure of part (a) above, and to illustrate the product improvement obtained by merely resorting to a two-step treatment procedure, two grams of the same sample of ammonium-exchanged zeolite Y as in part (a) were slurried in 100 ml. of 3.5 molar ammonium acetate solution and maintained at a temperature of 95° C. while adding 50 ml. of an aqueous AFS solution containing 0.53 weight percent AFS in increments of 5 ml. every 5 minutes. Upon completion of the AFS addition, the reaction mixture was digested quiescently at 95° C. for 20 hours. Thereafter the zeolite crystals were recovered by filtration and washed with water. The filtrate was analyzed for silicon and aluminum and the following data obtained:

Analysis of filtrate, First Addition

| mmoles of Si added: | 4.45 |
|---|---|
| mmoles of Si consumed: | 3.30 |
| % Si consumed: | 74 |
| mmoles of Al removed and recovered: | 3.74 |
| % dealumination: | 42 |

The zeolite crystals recovered from the first step treatment were again treated with an aqueous AFS solution using the same reagents and conditions as in the first step except that the temperature was reduced to 75° C. from 95° C. After the 20-hour digestion period, the filtrate and the zeolite product were analyzed. The results are as follows:

Analysis of filtrate, second addition

| mmoles of Si added: | 4.45 |
|---|---|
| mmoles of Si consumed: | 2.90 |
| % Si consumed: | 65 |
| mmoles of Al removed and recovered: | 2.80 |
| % dealumination: | 31 |
| Total mmoles of Si consumed in both steps: | 6.20 |
| % total dealumination: | 73 |

Analysis of the solid product compared to the starting NH$_4$Y

|  | NH$_4$Y | LZ-210 PRODUCT |
|---|---|---|
| SiO2/Al2O3 | 4.84 | 20.67 |
| Cation Equivalent, M$^+$/Al | 0.99 | 1.19 |
| Wt. % fluoride | 0 | 1.94 |
| Retained X-Ray Crystallinity, % | 100 | 40 |
| (est.) Unit Cell, a$_o$, in Angstroms | 24.73 | 24.51 |

-continued

|  | NH$_4$Y | LZ-210 PRODUCT |
|---|---|---|
| Framework Infrared | | |
| asymmetric stretch, cm$^{-1}$ | 1014 | 1096 |
| asymmetric stretch, cm$^{-1}$ | 786 | 813 |
| Crystal Collapse Temp. °C. (DTA). | 861 | 876 |

(c) As an illustration of the process of the present invention, 2270 grams (anhydrous weight) of an ammonium-exchanged zeolite Y having a SiO$_2$/Al$_2$O$_3$ molar ratio of 4.92 were slurried in 10 liters of distilled water at a temperature of 75° C. To the slurry was added, by means of a metering pump at the rate of 53 ml. per minute, a solution of 1010.1 grams of ammoniumfluorosilicate in 6 liters of water at a temperature of 55° C. Following completion of the addition of the fluorosilicate solution the reaction slurry was digested at 75° C. for 2 hours. The product was filtered and washed free of soluble fluoride with hot distilled water, dried and characterized. The dried product was labeled LZ-210(14). Chemical analyses results are shown below in Table II. The actual SiO$_2$/Al$_2$O$_3$ ratio of the product was 12.2.

A portion of the LZ-210(14) product of the first step treatment, anhydrous weight, was slurried in 1920 ml distilled water heated to 75° C. A solution containing 74.45 gm of (NH$_4$)$_2$SiF$_6$ in 500 ml distilled water was prepared and heated to 55° C. The solution contained 0.42 moles of Si and the stoichiometry was sufficient to raise the SiO$_2$/Al$_2$O$_3$ ratio of the product to 22. The fluorosilicate solution was added to the zeolite slurry in a continuous manner by means of a metering pump at a rate of 6.1 ml per minute (0.005 moles of Si added per minute per mole of Al in the zeolite). Following addition of the fluorosilicate solution, the reaction mixture was digested for 3 hours at 75° C. The zeolite product was filtered, washed free of soluble fluoride and dried. It was labeled LZ-210(22). Chemical analyses of the product are shown below in Table II.

TABLE II

|  | Starting NH$_4$Y | Product LZ-210(14) | Product LZ-210(22) |
|---|---|---|---|
| SiO$_2$/Al$_2$O$_3$ | 4.84 | 12.21 | 21.12 |
| Cation Equivalent, M$^+$/Al | 0.99 | 9.93 | 0.92 |
| Wt % fluoride | 0 | 0.11 | 0.07 |
| Retained X-Ray Crystallinity, % | 100 | 85 | 78 |
| Unit Cell, a$_o$ in Å | 24.73 | 24.45 | 24.39 |
| Framework Infrared: | | | |
| asymmetric stretch cm$^{-1}$ | 1014 | 1055 | 1064 |
| symmetric stretch cm$^{-1}$ | 786 | 816 | 818 |
| Hydroxyl Region Infrared: Absolute absorbance at 3710 cm$^{-1}$ | 0.042 | 0.230 | 0.310 |
| Defect Structure Factor, z: | 0.018 | 0.097 | 0.131 |
| Change in Defect Structure, Δz: | — | 0.079 | 0.034 |
| Crystal Collapse Temp., °C. (DTA). | 861 | 1120 | 1145 |

The framework mole fractions of oxides are calculated and compared below:

| NH$_4$Y | [Al$_{0.287}$ Si$_{0.695}$ 0.018]O$_2$ |
| LZ-210(14) | [Al$_{0.127}$ Si$_{0.776}$ 0.097]O$_2$ |
| LZ-210(22) | [Al$_{0.075}$ Si$_{0.794}$ 0.0131]O$_2$ |

A review of the data set forth in Example 1 clearly indicates the following:

The product of the treatment described in part (a) contains a substantial amount of non-removable fluoride which accounts in part for the lack of increased thermal stability. The amount of dealumination is only 60%, yet sufficient reagent was added to remove and replace 100% of the aluminum in the zeolite. The hydroxyl region of the infrared spectrum showed a substantial amount of absorbance due to hydrogen-bonded OH groups, indicative of dealumination without silicon substitution. Overall, the reaction efficiency to dealuminate or substitute silicon into the zeolite framework is poor. The prolonged treatment (>20 hours), due to excessive hydrolysis of a dilute solution of AFS (1.05 wt. %), in solutions containing high levels of fluoride caused formation of sparingly soluble fluoride compounds which further decreased the stability of the zeolite. It is to be noted that the use of a buffering solution did not prevent the undesirable results.

The product of the two-step procedure of part (b), while superior to that of the one-step procedure of part (a), is still unsatisfactory in some respects. Here, again, the use of dilute AFS solutions, the higher reaction temperatures and excessive reaction times caused severe degradation of the crystal structure, even though a buffering agent was employed. Crystallinity of the final zeolite product was only about 40 percent.

In the preparation of the product of part (c) of the Example, AFS solutions of higher AFS concentration were used in each of the two steps (about 1.0 molar solution of AFS in step 1 and about 0.8 molar AFS in step 2). Also the contact of AFS solution with the zeolite was limited to less than 4 hours in step 1 (from the beginning of AFS addition to the zeolite slurry) and to about 4.5 hours in step 2. It is important to note that no buffer was employed in either of the two treatment stages of the procedure of part (c). Despite this, the crystallinity of the final zeolite Y was 78 percent and the SiO$_2$/Al$_2$O, ratio was 21.12.

What is claimed is:

1. The process for substituting silicon into the crystal lattice of zeolites in place of extracted lattice aluminum atoms to achieve zeolite products of higher silicon content which comprises:
    (a) providing a starting aluminosilicate zeolite having a framework SiO$_2$/Al$_2$O$_3$ molar ratio of at least 2 and pore diameters of at least 3 Angstroms;
    (b) contacting said starting zeolite at a temperature of 25° C. to 95° C. with an aqueous solution of a fluorosilicate salt containing from 0.5 to 1.5 moles per liter of said fluorosilicate salt dissolved therein, the proportions of zeolite and fluorosilicate salt being at least 0.1 moles of salt per 100 grams of anhydrous zeolite;
    (c) maintaining contact between the zeolite and the salt solution for a period not in excess of 5 hours;
    (d) removing from contact with the zeolite the liquid medium containing at least 90 percent of the byproduct fluoroaluminate salt produced by the reaction of the fluorosilicate salt with the zeolite.

2. The process according to claim 1 wherein the starting aluminosilicate zeolite provided in step (a) has a framework SiO$_2$/Al$_2$O$_3$ molar ratio of at least 3.

3. The process according to claim 1 which the removal of the liquid medium in step (d) is accomplished at least in part by washing the zeolite crystals with water.

4. The process according to claim 1 wherein following step (d) the procedures of steps (b), (c) and (d) are repeated at least once.

5. The process according to claim 4 wherein at least one of the steps (d) is accomplished by washing with water.

6. The process according to claim 1 wherein the fluorosilicate salt is ammonium fluorosilicate.

7. The process according to claim 6 wherein the zeolite starting material has the structure of zeolite Y.

* * * * *